United States Patent
Laubender

(10) Patent No.: US 7,975,539 B2
(45) Date of Patent: Jul. 12, 2011

(54) METHOD AND DEVICE FOR REDUCING VIBRATIONS DURING THE SHUTDOWN OR STARTUP OF ENGINES, IN PARTICULAR INTERNAL COMBUSTION ENGINES

(75) Inventor: Jochen Laubender, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 386 days.

(21) Appl. No.: 12/231,602

(22) Filed: Sep. 3, 2008

(65) Prior Publication Data

US 2009/0063026 A1 Mar. 5, 2009

(30) Foreign Application Priority Data

Sep. 5, 2007 (DE) ......................... 10 2007 042 222

(51) Int. Cl.
*G01M 15/12* (2006.01)
(52) U.S. Cl. ................................. 73/115.01; 73/117.01
(58) Field of Classification Search .............. 73/114.07, 73/114.77, 117.01, 115.01
See application file for complete search history.

(56) References Cited

U.S. PATENT DOCUMENTS

| | | | |
|---|---|---|---|
| 5,792,948 A * | 8/1998 | Aoki et al. ................. | 73/115.01 |
| 6,588,397 B1 | 7/2003 | Sieber | |
| 7,150,257 B2 * | 12/2006 | Yamada et al. ............. | 123/192.1 |
| 7,409,268 B2 * | 8/2008 | Ichikawa et al. ............. | 700/280 |
| 7,706,924 B2 * | 4/2010 | Ichikawa et al. ............. | 700/280 |
| 2004/0086134 A1* | 5/2004 | Matsuoka et al. ........... | 381/71.4 |
| 2005/0206055 A1* | 9/2005 | Nemoto ................... | 267/140.11 |
| 2007/0138338 A1* | 6/2007 | Luo et al. ........................ | 244/54 |
| 2009/0045560 A1* | 2/2009 | Fueki et al. ............. | 267/140.15 |

FOREIGN PATENT DOCUMENTS

DE 19955857 11/2004

* cited by examiner

*Primary Examiner* — Eric S McCall
(74) *Attorney, Agent, or Firm* — Kenyon & Kenyon LLP

(57) ABSTRACT

A method and a device for reducing vibrations during the shutdown or startup of an engine, in particular an internal combustion engine, in which the vibration behavior of the engine is determined at least during shutdown and/or startup, a control signal is applied to at least one engine mounting whose damping properties are settable via the control signal, and the control signal is calculated in such a way that a vibration behavior of the engine materializes according to a setpoint vibration behavior in which vibrations are introduced, for example into a passenger compartment, at a level which lies below a predefined threshold value.

15 Claims, 2 Drawing Sheets

METHOD AND DEVICE FOR REDUCING VIBRATIONS DURING THE SHUTDOWN OR STARTUP OF ENGINES, IN PARTICULAR INTERNAL COMBUSTION ENGINES

CROSS REFERENCE

This application claims the benefit under 35 U.S.C. §119 of German Patent Application No. 102007042222.0 filed on Sep. 5, 2007, which is expressly incorporated by reference in its entirety.

FIELD OF THE INVENTION

The present invention relates to a method and a device for reducing vibrations during the shutdown or startup of engines, in particular internal combustion engines having direct start mechanisms for motor vehicles.

BACKGROUND INFORMATION

Among the comfort requirements imposed on modern motor vehicles is noise and vibration damping, which includes the reduction, damping, or prevention of the introduction of vibrations which emanate, for example, from an internal combustion engine used as the power plant. For this purpose, engine mountings are designed to have specific damping properties to provide optimum damping of at least vibrations which occur at certain frequencies and amplitudes during regular engine operation. However, engine mountings designed in this manner are usually unable to damp vibrations which occur at substantially deviant frequencies and amplitudes, which may be the case, for example, when starting up and/or shutting down an internal combustion engine. Particularly great deviations from the normal operation of an internal combustion engine result when vibrations occur while starting up or shutting down internal combustion engines having direct start mechanisms, as is explained briefly below.

Different methods are used for starting up an internal combustion engine without a starter or using only minimal starter support. These methods are usually referred to as direct start or starter-supported direct start. One of these methods involves a conventional direct start using an upstream reverse rotation phase, the so-called extended direct start (described in German Patent Application No. DE 199 55 857 A1). Common to all direct start variants is the fact that the charge in the cylinders has a low air mass and a somewhat high residual exhaust gas concentration at high engine temperatures. This is additionally supported by actively closing the engine throttle valve while the internal combustion engine is coasting to avoid too strong engine vibrations, since a negative pressure ratio prevails from the exhaust valves to the intake valves during the valve overlap phase, which causes a greater amount of residual exhaust gas to flow from the exhaust manifold, for example, to the intake manifold. This process may be counteracted by using a method for the selective coasting control of an internal combustion engine, in which actively opening the throttle valve while the engine is coasting minimizes the influence of the residual exhaust gas. An electrical compressor may also be used to selectively flush the residual exhaust gas out of the cylinders with the aid of overpressure. By opening the throttle valve or flushing with the aid of overpressure, however, engine vibrations are substantially increased again by the greater piston compression during the coasting phase of the internal combustion engine. These vibrations are transmitted via conventional engine mountings to the passenger compartment, which may be unacceptable to both the manufacturer and the end customer. Even if the internal combustion engine is started up following a shutdown of the internal combustion engine controlled in this manner, e.g., in start-stop mode, using one of the aforementioned direct-start variants, the internal combustion engine begins strongly vibrating to a certain extent, since the combustion operations in the two cylinders fired first each represent a full-load combustion, in contrast to a conventional starter-controlled start, and the pistons in the internal combustion engine are greatly accelerated thereby. These vibrations are extremely pronounced, in particular in the case of extended direct start having an upstream reverse rotation phase.

Attempts have been made to weaken these vibrations, in part, by retarding the ignition angle. However, the disadvantage of this method is the fact that a required starting time is frequently unreachable thereby, since the center of mass position of the combustion operations is selectively impaired. Therefore, a conflicting goal exists between the fastest possible direct startup and a preferably low-vibration direct start, which must be taken into account when selecting the preferred direct start method.

SUMMARY

Although the present invention is generally applicable to all engine operating states which are characterized by a vibration behavior deviating strongly from normal operation, the present invention is explained below with regard to directly startable internal combustion engines during startup or shutdown.

The conflicting goal between the fastest possible direct start and a preferably low-vibration direct start is mitigated according to an example embodiment of the present invention by the fact that an active engine mounting system whose damping properties during the startup and/or shutdown of preferably direct-startable internal combustion engines are adjusted to an optimum damping of the vibrations occurring during startup or shutdown. For this purpose, at least one active engine mounting must be incorporated into the mounting of the internal combustion engine, the vibration properties of this mounting being controllable at least during the startup or shutdown of the internal combustion engine.

Thus, when starting up or shutting down an internal combustion engine mounted according to an example embodiment of the present invention, even with the throttle valve open and a particularly high vibration tendency of the internal combustion engine, the damping of the engine mounting system must be varied in such a way that the vibrations of the internal combustion engine are not transmitted to the passenger compartment even during startup or shutdown. As a result, the startup behavior in all direct start methods may be optimized while retaining the current level of comfort with regard to starting speed, reproducibility and reliability as well as noise development, without having to take into account the vibration tendency occurring in the internal combustion engine itself as a limiting factor.

In accordance with the present invention, an example method is provided for reducing vibrations during the shutdown or startup of engines, in particular internal combustion engines, in which the vibration behavior of the internal combustion engine is determined at least during shutdown and/or startup, a control signal being applied to at least one engine mounting whose damping properties are settable via the control signal, and the control signal being calculated in such a way that a vibration behavior of the internal combustion engine materializes according to a setpoint vibration behavior in which vibrations are introduced, for example, into a passenger compartment at a level which lies below a predefined threshold value.

An example device suitable for implementing the example method according to the present invention includes one for reducing vibrations during the shutdown or startup of engines, in particular internal combustion engines, which includes at least one active engine mounting whose damping properties are settable in such a way that, during shutdown and/or startup, a vibration behavior of the internal combustion engine materializes according to a setpoint vibration behavior in which vibrations are introduced, for example, into a passenger compartment, at a level below a predefined threshold value, the device also including at least one sensor for detecting a parameter describing the vibration behavior of the internal combustion engine, an actuator for setting the damping properties of the active engine mounting and at least one control unit for evaluating the output signal of the sensor and calculating a control signal for triggering the actuator.

The threshold value, which is defined as the upper limit of the vibrations which are allowed to be transmitted, may be advantageously selected in such a way that no noticeable change in the vibration behavior is apparent to the driver of a vehicle equipped according to the example embodiment of the present invention when the engine is started up or shut down.

The vibration behavior of the engine may be advantageously determined by evaluating the output signal of at least one acceleration sensor and/or yaw rate sensor, hereinafter referred to briefly as acceleration sensor. Acceleration sensors of this type are provided in any case in many vehicles having electronic stability programs or for the purpose of crash detection. If the output signals of these acceleration sensors are evaluated accordingly during the startup or shutdown of the engine provided in vehicles of this type, the vibration behavior of the engine is recordable, for example, in the form of a vibration pattern, without having to install separate acceleration sensors for carrying out the present invention.

The control signal may be advantageously calculated by using a comparison method between a parameter describing the setpoint vibration behavior and a parameter describing the actual vibration behavior, using for example a comparison method between a setpoint vibration pattern and an actual vibration pattern if acceleration sensors are used.

If sensors used to detect a parameter describing the vibration behavior of the engine are provided for multiple applications, it may be advantageous to adapt the read mode to the particular application for which the output signals of the sensors are to form an input variable. For this reason, it may be advantageous in connection with the present invention to provide and process a signal which displays the beginning of the engine startup or shutdown.

The example engine mounting system according to the present invention may include multiple active engine mountings. It is particularly advantageous if the damping properties of the active engine mountings are very rapidly variable, for example at frequencies lying in the range of the vibrations to be damped. For this purpose, it is advantageous to construct engine mountings as fluid-based damping elements, for example on the basis of rheological fluids. These contain alignable particles which influence the viscosity of the rheological fluid as a function of their alignment. In a damping element filled with a rheological fluid, the flow resistance of the fluid in the damping element is controllable for this purpose, for example by an applied variable magnetic field or electrical field. As a function of the field strength of the magnetic field or electrical field, magnetic or electrically polarizable particles contained in the rheological fluid change from an unsorted to a sorted arrangement, which is accompanied by a change in the viscosity and therefore the damping properties of a damping element of this type. By suitably controlling the buildup and breakdown of the magnetic field or electrical field, the damping properties are variable within a very short period of time, which is the reason why damping elements of this type are suitable as engine mountings for implementing the example embodiment of the present invention.

Advantageously, at least one active engine mounting on the basis of rheological fluids may be included. This mounting may be used to influence the damping properties of the entire engine mounting system even if other active and/or passive engine mountings are included.

BRIEF DESCRIPTION OF THE DRAWINGS

The present invention is explained in greater detail on the basis of an exemplary embodiment.

DETAILED DESCRIPTION OF EXAMPLE EMBODIMENTS

Figure 1:
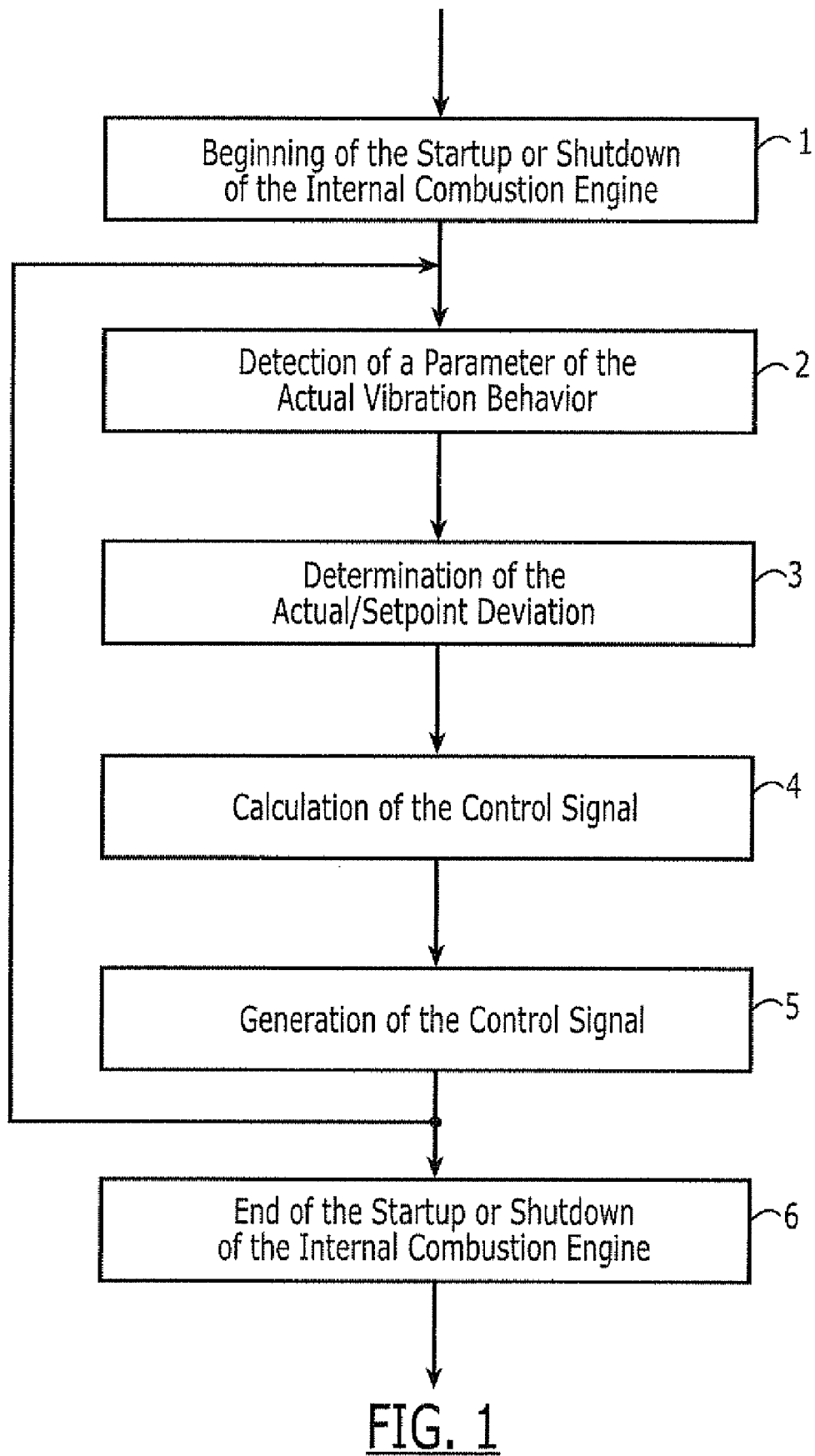
FIG. 1 shows a flow chart of an example method according to the present invention for reducing vibrations.

FIG. 1 shows a flow chart of an example method according to the present invention for reducing vibrations during the startup or shutdown of an engine, based on the example of an internal combustion engine. In a first step 1, the beginning of the startup or shutdown phase is detected. This may be done by evaluating a corresponding signal which indicates the beginning of this phase, or by directly evaluating different parameters which also clearly show the initiation of a startup or shutdown phase. At least one parameter which describes the actual vibration behavior of the internal combustion engine is subsequently detected in a step 2. To enable conclusions about the actual vibration behavior to be drawn, the values of the detected parameter are evaluated in a special algorithm at least during the shutdown and startup of the internal combustion engine. For example, vibration patterns which represent the vibration behavior of the internal combustion engine in an adequate manner for the vibration damping according to the present invention may be derived from the output signal of an acceleration sensor.

The deviation of the actual vibration behavior of the internal combustion engine from a setpoint vibration behavior, in which vibrations would be introduced into the passenger compartment at a level below a predefined threshold value, is determined in a further step 3. A control signal is calculated from this deviation in a further step 4 and generated in a further step 5, it being possible to use this control signal to set the damping properties of at least one active engine mounting in such a way that the aforementioned setpoint vibration behavior materializes at the internal combustion engine. This state is achievable, if necessary, by repeating steps 2 through 5 multiple times by re-determining the actual vibration behavior of the internal combustion engine after a first application of the control signal and adjusting the control signal if necessary. A cyclical repetition of steps 2 through 5 ensures and, at the same time, makes it possible to monitor and, if necessary, correct the effective vibration behavior during the startup or shutdown of the internal combustion engine. The generation of the control signal includes the application thereof to an actuator, via which the damping properties of at least one active engine mounting are actually set. The end of the startup or shutdown phase is detected in a final step 6.

During the shutdown or startup of the internal combustion engine, the actuators of the rheological engine mountings are triggered in such a way that the driver is unable to perceive any noticeable vibrations in the driver compartment. In addition, the regulating algorithm may advantageously compensate for or adaptively take into account external influences such as temperature changes or electromagnetic interference fields.

Figure 2:
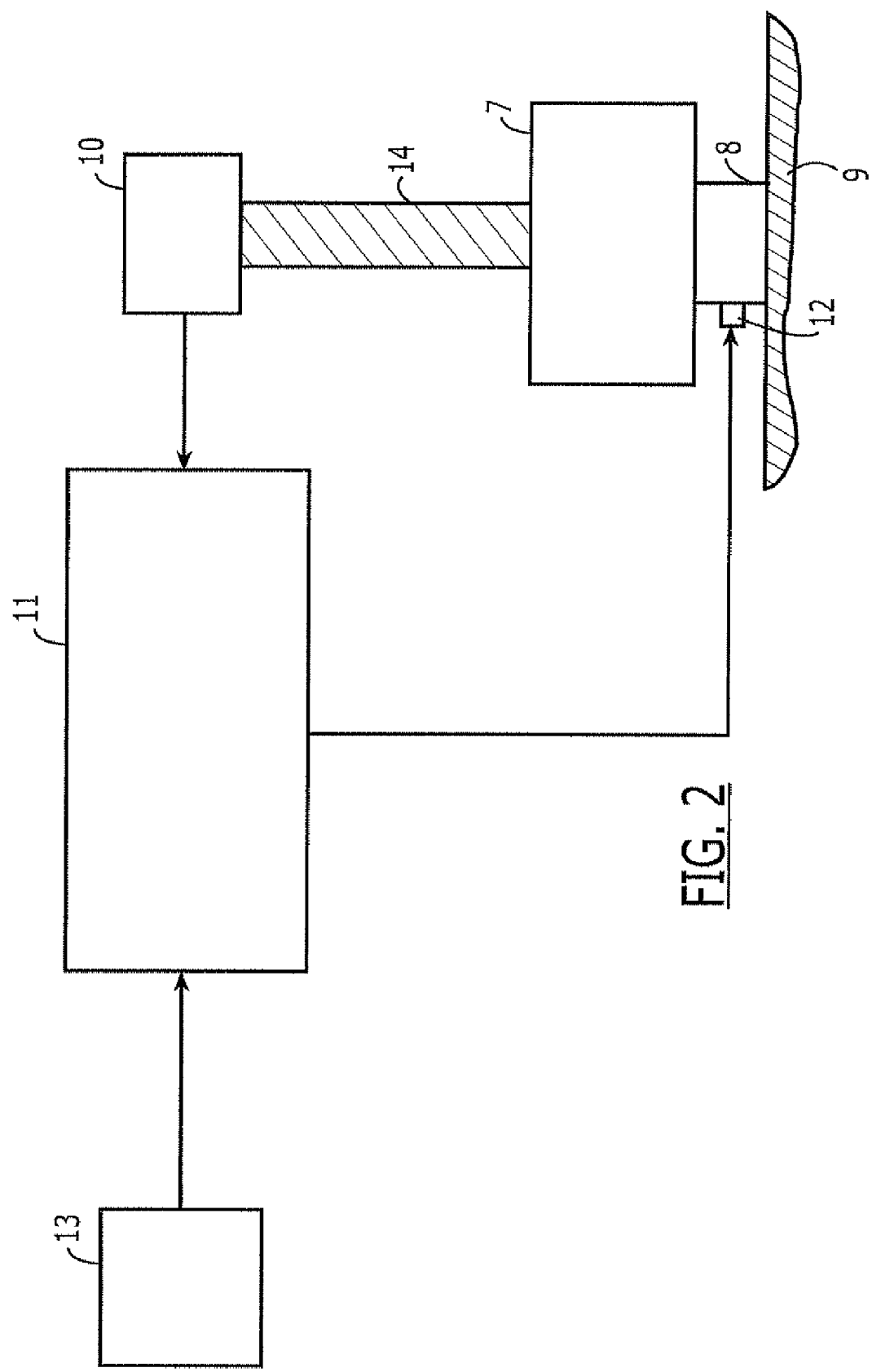
FIG. 2 shows a schematic representation of an example device for implementing the method according to the present invention.

FIG. 2 shows a schematic representation of a device for implementing the method according to the present invention. The figure shows an internal combustion engine 7 which is connected to a body 9 of a vehicle via an active engine mounting 8, which is designed as a rheological engine mounting. At this point, active engine mounting 8 is representative of any engine mounting system whose damping properties are controllable, multiple engine mounting systems being expressly provided.

Also included is a sensor 10 which is suitable for detecting a parameter which describes the vibration behavior of internal combustion engine 7. This sensor 10, which in the present exemplary embodiment is designed as an acceleration sensor, supplies its output signals to a control unit 11, which includes at least a component, for example in the form of a special-purpose controller, for calculating and generating, from the output signal of sensor 10, a control signal which may be supplied to an actuator 12, via which the damping properties of active engine mounting 8 are settable. The detected values are stored for this purpose in memory units of control unit 11. Control unit 11 may be a specially designed engine control unit or may be a separate control unit for regulating the vibration damping. The data structure in the memory units of control unit 11 may be organized according to the further data processing, for example in the form of characteristic maps or characteristic curves. A further advantageous option is to store the data in memory units of a neural network, which may also be implemented in control unit 11. In this case, the detection speed may be further increased by adaptive learning. In any case, the values detected by sensor 10 form input variables of the regulated and controlled system according to the example embodiment of the present invention, which handles the activation of active engine mountings 8. Control unit 11 advantageously includes additional memory units whose data structure is organized in a manner similar to the data structure of the memory units for storing the values detected by sensor 10. The values which correspond to the detected values and describe the setpoint vibration behavior of the internal combustion engine are stored in these memory units. For example, the storage of the setpoint values may also be organized in the form of characteristic maps, characteristic curves, or in memory units of a neural network. Comparison operations, which are executed in step 3 of the method in FIG. 1, are computationally facilitated by a similar data structure of the setpoint and actual values. In particular, this is advantageous if the vibration behavior is to be continuously regulated during the shutdown or during the startup process of the internal combustion engine; thus, for example, a vibration pattern, which is updated in short cycles, must be compared with a setpoint vibration pattern. Subtraction, addition, division, multiplication, differentiation, and integration methods as well as level or pattern comparison methods may be suitable comparison methods in this regard. The setpoint damping behavior of active, in particular, rheological engine mounting 8 may also be adaptively learned, i.e., continuously updated, if control unit 11 has a neural network structure.

A signal transducer 13 is also provided which is able to generate a signal which indicates the beginning of the startup or shutdown of internal combustion engine 7. A simple ignition status indicator may be used as a signal transducer 13 of this type. However, the signal transducer may also be part of control unit 11. In the present exemplary embodiment, internal combustion engine 7 is designed for direct starts. A connection 14, which provides a link between sensor 10 and internal combustion engine 7 which is suitable for the measurement function, exists between sensor 10 and internal combustion engine 7. In the case of an acceleration sensor, this connection is a mechanical connection which is able to communicate directly or via the vehicle body. Different field-generating mechanisms may be used as actuators 12. Hydraulically or also electromagnetically operable actuators may also be provided to weaken the vibrations of the internal combustion engine in a defined manner.

[Flow Chart in FIG. 1]
Beginning of the startup or shutdown of the internal 1 combustion engine
Detection of a parameter of the actual vibration 2 behavior
Determination of the actual/setpoint deviation 3
Calculation of the control signal 4
Generation of the control signal 5
End of the startup or shutdown of the internal 6 combustion engine

What is claimed is:

1. A method for reducing vibrations during shutdown or startup of an internal combustion engine, comprising:
    detecting the beginning of at least one of shutdown and startup;
    determining vibration behavior of the engine during at least one of shutdown and startup; and
    applying a control signal to at least one engine mounting whose damping properties are settable via the control signal, the control signal being calculated in such a way that a vibration behavior of the engine materializes according to a setpoint vibration behavior in which vibrations are introduced at a level below a predefined threshold value.

2. The method as recited in claim 1, wherein the vibration behavior of the engine is determined by evaluating an output signal of at least one acceleration sensor.

3. The method as recited in claim 1, wherein the control signal is calculated by using a comparison method between a parameter describing the setpoint vibration behavior and a parameter describing actual vibration behavior.

4. The method as recited in claim 3, wherein the comparison method is between a setpoint vibration pattern and an actual vibration pattern.

5. The method as recited in claim 1, wherein a signal indicating a beginning of the startup or shutdown of the engine is processed.

6. The method as recited in claim 1, wherein the vibration behavior of the engine is determined by evaluating an output signal of at least one acceleration sensor, and wherein the control signal is calculated by using a comparison method between a parameter describing the setpoint vibration behavior and a parameter describing actual vibration behavior.

7. The method as recited in claim 6, wherein the comparison method is between a setpoint vibration pattern and an actual vibration pattern, and wherein a signal indicating a beginning of the startup or shutdown of the engine is processed.

8. A device for reducing vibrations during shutdown or startup of an internal combustion engine, comprising:
- a signal transducer adapted to output a signal indicating a beginning of the startup or shutdown of the engine;
- at least one active engine mounting whose damping properties are settable in such a way that, during at least one of the shutdown and startup of the engine, a vibration behavior materializes according to a setpoint vibration behavior in which vibrations are introduced at a level below a predefined threshold value;
- at least one sensor adapted to detect a parameter describing the vibration behavior of the engine;
- an actuator adapted to set the damping properties of the active engine mounting; and
- a control unit adapted to evaluate an output signal of the sensor and calculate a control signal for activating the actuator.

9. The device as recited in claim 8, wherein multiple active engine mountings are provided.

10. The device as recited in claim 8, wherein at least one active engine mounting is provided based on rheological fluids.

11. The device as recited in claim 8, wherein the sensor adapted to detect a parameter describing the vibration behavior of the engine includes at least one acceleration sensor.

12. The device as recited in claim 8, wherein the engine is a direct-startable internal combustion engine.

13. The device as recited in claim 8, wherein the sensor adapted to detect a parameter describing the vibration behavior of the engine includes at least one acceleration sensor, and wherein the engine is a direct-startable internal combustion engine.

14. The device as recited in claim 8, wherein multiple active engine mountings are provided, and wherein at least one active engine mounting is provided based on rheological fluids.

15. The device as recited in claim 14, wherein the sensor adapted to detect a parameter describing the vibration behavior of the engine includes at least one acceleration sensor, and wherein the engine is a direct-startable internal combustion engine.

* * * * *